(12) United States Patent
Guo et al.

(10) Patent No.: US 9,350,507 B2
(45) Date of Patent: May 24, 2016

(54) METHOD AND SYSTEM FOR NOTIFICATION OF SCRAMBLING CODE IDENTIFICATION SIGNALLING GROUP

(75) Inventors: Senbao Guo, Shenzhen (CN); Yunfeng Sun, Shenzhen (CN); Chenchen Zhang, Shenzhen (CN); Min Ren, Shenzhen (CN); Wei Gou, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 105 days.

(21) Appl. No.: 13/980,704

(22) PCT Filed: Nov. 29, 2011

(86) PCT No.: PCT/CN2011/083132
§ 371 (c)(1),
(2), (4) Date: Jul. 19, 2013

(87) PCT Pub. No.: WO2012/097647
PCT Pub. Date: Jul. 26, 2012

(65) Prior Publication Data
US 2014/0018086 A1    Jan. 16, 2014

(30) Foreign Application Priority Data
Jan. 19, 2011 (CN) .......................... 2011 1 0022108

(51) Int. Cl.
*H04W 72/00* (2009.01)
*H04L 5/00* (2006.01)
(Continued)

(52) U.S. Cl.
CPC ............ *H04L 5/0048* (2013.01); *H04L 1/0038* (2013.01); *H04L 25/0224* (2013.01); *H04L 5/0035* (2013.01); *H04L 5/0091* (2013.01); *H04L 25/03866* (2013.01)

(58) Field of Classification Search
CPC ... H04L 5/0048; H04L 5/0035; H04L 5/0073; H04L 5/0051; H04L 27/2613; H04L 27/261; H04W 72/04

USPC ......... 455/442, 443, 444, 448, 515, 524, 525, 455/450, 509; 370/230, 335, 342
See application file for complete search history.

(56) References Cited

U.S. PATENT DOCUMENTS 7,808,882 B2    10/2010    Imamura
2008/0260062 A1    10/2008    Imamura
(Continued)

FOREIGN PATENT DOCUMENTS

CN    101682362 A    3/2010
CN    101854668 A    10/2010
(Continued)

OTHER PUBLICATIONS

3gpp TS 36.211 V10.3.0 , 3rd Generation Partnership Project; Technical Specification Group Radio Access Network; Evolved Universal Terrestrial Radio Access (E-UTRA); Physical Channels and Modulation (Release 10) Sep. 2011.*
(Continued)

*Primary Examiner* — Wayne Cai
*Assistant Examiner* — Said Elnoubi
(74) *Attorney, Agent, or Firm* — Oppedahl Patent Law Firm LLC

(57) ABSTRACT

Disclosed in the present disclosure is a method for notification of scrambling code identification signalling group, and the present disclosure comprises: a network side transmits a scrambling code identification signalling group to a receiver; the receiver generates a corresponding scrambling code sequence of a demodulation pilot according to the scrambling code identification signalling group, generates a pilot symbol sequence according to the scrambling code sequence of the demodulation pilot, and performs channel estimation according to the pilot symbol sequence. The present disclosure also provides a system for implementing the notification of scrambling code identification signalling group. According to the technical solution in the disclosure, the receiver can obtain, according to the scrambling code identification signalling group transmitted from the network side, the scrambling code sequence of the demodulation reference signal and/or demodulation pilot which is the same as that of the network side, and thus interference can be avoided.

13 Claims, 8 Drawing Sheets

(51) Int. Cl.
*H04L 1/00* (2006.01)
*H04L 25/02* (2006.01)
*H04L 25/03* (2006.01)

(56) References Cited

U.S. PATENT DOCUMENTS

| | | | |
|---|---|---|---|
| 2008/0305788 A1 | 12/2008 | Malladi et al. | |
| 2010/0285810 A1* | 11/2010 | Ko | H04B 7/024 455/450 |
| 2010/0322178 A1 | 12/2010 | Li et al. | |
| 2011/0013504 A1 | 1/2011 | Imamura | |
| 2011/0100334 A1* | 5/2011 | Clarke | F01B 7/14 123/51 R |
| 2011/0103324 A1* | 5/2011 | Nam et al. | 370/329 |
| 2013/0051214 A1* | 2/2013 | Fong | H04W 24/10 370/216 |
| 2013/0070634 A1* | 3/2013 | Gao | H04W 24/10 370/252 |

FOREIGN PATENT DOCUMENTS

| | | |
|---|---|---|
| CN | 101931485 A | 12/2010 |
| WO | 2008130051 A1 | 10/2008 |

OTHER PUBLICATIONS

3GPP TS 36.300 V10.5.0 , 3rd Generation Partnership Project;Technical Specification Group Radio Access Network; Evolved Universal Terrestrial Radio Access (E-UTRA) and Evolved Universal Terrestrial Radio Access Network (E-UTRAN); Overall description; Stage 2 (Release 10) Sep. 2011.*
3gpp TS 36.211 v10.3.0, "3rd Generation Partnership Project, Technical Specification Group Radio Access Network,Evolved Universal Terrestrial Radio Access (E-UTRA);Physical Channels and Modulation", Sep. 2011, (Release 10).*
International Search Report in international application No. PCT/CN2011/083132, mailed on Mar. 1, 2012.
English Translation of the Written Opinion of the International Search Authority in international application No. PCT/CN2011/083132, mailed on Mar. 1, 2012.
Physical channels and modulation Dec. 2010.

* cited by examiner

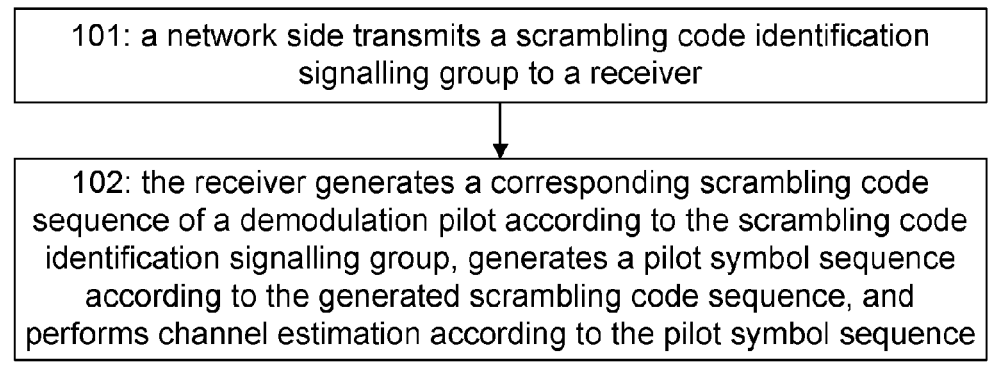
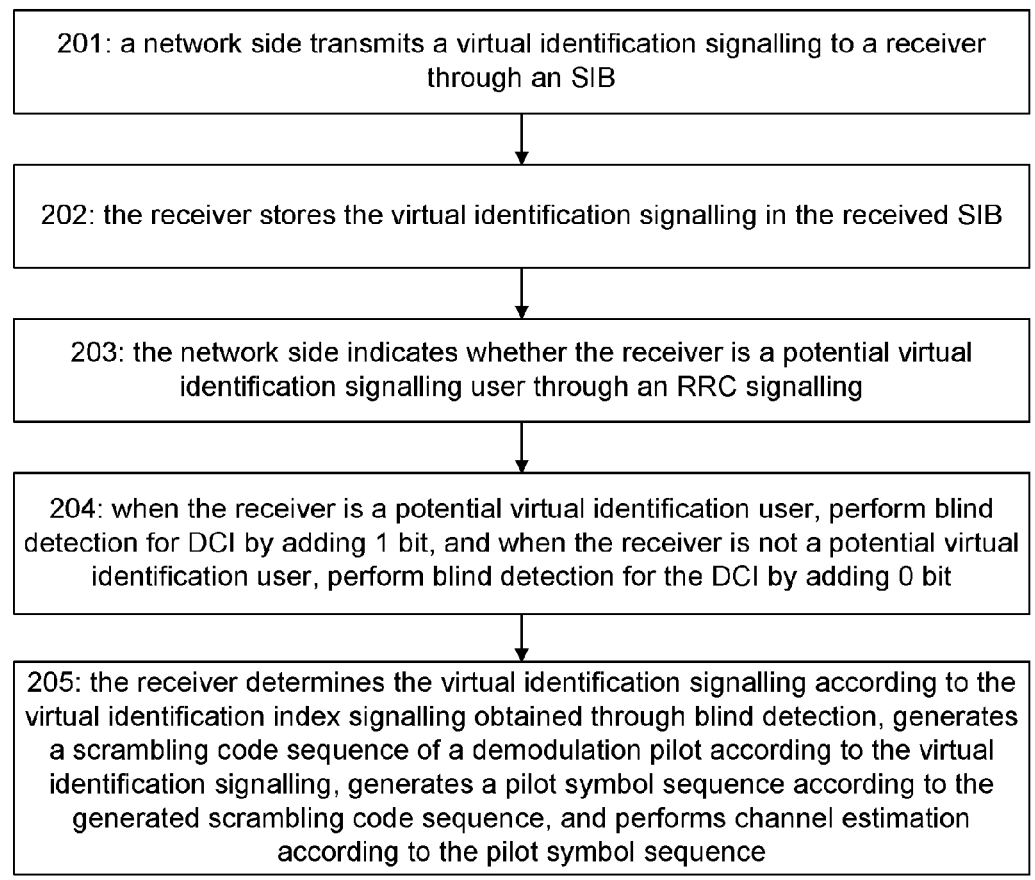

METHOD AND SYSTEM FOR NOTIFICATION OF SCRAMBLING CODE IDENTIFICATION SIGNALLING GROUP

TECHNICAL FIELD

The present disclosure relates to a Long Term Evolution Advanced (LTE-advanced) system and in particular to method and system for notification of scrambling code identification signalling group.

BACKGROUND

In an LTE system, in order to measure the quality of a channel and demodulate the received data symbols, a Common Reference Signal (CRS) is designed. A receiver may measure the quality of the channel by using the CRS, so as to determine whether the receiver will perform cell reselection and switch to a target cell, and the channel quality is measured when the receiver is in a connected state. When the interference level is relatively high, the physical layer of the receiver may disconnect from the network side through a wireless link connection failure signalling related to a higher layer. Two pilots including a Demodulation Reference Signal (DMRS) and a Channel State Information Reference Signal (CSI-RS) are introduced into LTE Release 10. The receiver demodulates data by using the DMRS and measures the quality of the channel by using the CSI-RS, so as to feed back information including a Pre-coding Matrix Indicator (PMI)/a Channel Quality Indicator (CQI)/a Rank Indicator (RI) etc. to the network side. An advantage of such a configuration is that the overhead of the channel state reference signal can be reduced while improving the accuracy of channel estimation. Another advantage of the DMRS is that transparent detection of the receiver can be realized, i.e. the receiver does not need to know the pre-coding weight applied to Evolved Node B (eNodeB) transmission. Interlayer interference can be estimated by using the DMRS, especially for Transmission Mode 9 applied by a receiver of Release 10, so as to use an advanced receiver to reduce detection errors caused by the interlayer interference.

In the development of future communication technology, it is necessary to realize cell "miniaturization", i.e. in future scenarios, not only uniformly-distributed macro-eNodeBs, but also micro cells that are distributed in a non-uniform manner (for example, Picos, HeNodeB and relays) are required to be considered. In a distribution scenario of such micro cells distributed in a non-uniform manner, not only interference between macro-eNodeBs but also interference between a macro-eNodeB and a micro base station (for example, a Pico, a HeNodeB and a relay) exists. Since the transmission power of a macro-eNodeB is relatively high, interference in such a heterogeneous network is even serious, and thus it will become an important aspect of LTE Release 11 to research technologies for avoiding/eliminating interference among cells. Multiple-Input and Multiple-Output (MIMO) enhancement of R10 is also mainly based on enhancement of a single cell. However, when considering a scenario of the heterogeneous network, it only considers avoiding interference among a plurality of cells through a simple time-division method. In LTE Release 11, Coordinated Multi-Point (COMP) transmission technology may be introduced to avoid interference among cells, especially interference among a plurality of cells in the heterogeneous network.

Coordinated Multi-Point COMP technology avoids interference among a plurality of cells through beam-space division technology. Currently, major techniques of COMP may be divided into: COMP joint transmission and COMP cooperative scheduling/COMP cooperative beam. When COMP joint transmission is used, different coordinated cells participating in COMP joint transmission need to apply the same scrambling code sequence to scramble the transmitted data and DMRSs, a receiver will fail to combine signals transmitted by a plurality of cells and obtain a combined diversity gain if different cells participating in coordination apply different scrambling code sequences. In addition, when a COMP beam method is applied to reduce interference among receivers of different cells, if different cells use different DMRS scrambling codes, then the receivers of different cells can hardly estimate the interference between the receivers accurately through DMRSs, so that the interference cannot be compressed by an advanced receiving technology, or reference signals and data scrambling code sequences of different transmitting sides cannot be notified dynamically to receivers during Dynamic Cell Selection (DCS).

SUMMARY

Therefore, the present disclosure provides method and system for notification of scrambling code identification signalling group. According to a scrambling code identification signalling group transmitted from a network side, a receiver can obtain a scrambling code sequence of a demodulation pilot which is the same as that of the network side, and thus the interference can be avoided.

The technical solution of the present disclosure is realized in the following way:
the present disclosure provides a method for notification of scrambling code identification signalling group, the method includes:
a network side transmits a scrambling code identification signalling group to a receiver; the receiver generates a corresponding scrambling code sequence of a demodulation pilot according to the scrambling code identification signalling group, generates a pilot symbol sequence according to the scrambling code sequence of the demodulation pilot, and performs channel estimation according to the pilot symbol sequence.

In the method above,
the scrambling code identification signalling group may include a virtual identification signalling, and/or a virtual identification enabling signalling and/or a virtual identification index signalling.

In the method above, when the scrambling code identification signalling group includes the virtual identification signalling, the virtual identification enabling signalling and the virtual identification index signalling, the step that the network side transmits the scrambling code identification signalling group to the receiver, and the receiver generates the corresponding scrambling code sequence of the demodulation pilot according to the scrambling code identification signalling group may include:
the network side transmits the virtual identification signalling to the receiver via a System Information Block (SIB) or a Radio Resource Control (RRC) signalling, and the receiver stores the virtual identification signalling in the received SIB or RRC signalling;
the network side indicates, through the RRC signalling, whether the receiver is a potential virtual identification signalling user, performs blind detection for Downlink Control Information (DCI) by 1 bit when the receiver is a potential virtual identification user, and performs blind detection for the DCI by 0 bit when the receiver is not a potential virtual identification user;

the receiver determines the virtual identification signalling according to the virtual identification index signalling obtained through the blind detection, and generates the scrambling code sequence of the DMRS according to the virtual identification signalling.

In the method above, when the scrambling code identification signalling group includes the virtual identification signalling, the virtual identification enabling signalling and the virtual identification index signalling, the step that the network side transmits the scrambling code identification signalling group to the receiver, and the receiver generates, according to the scrambling code identification signalling group, the corresponding scrambling code sequence of the DMRS may include:

the network side transmits the virtual identification signalling to the receiver through an SIB or RRC, and the receiver stores the virtual identification signalling in the received SIB or RRC;

the network side indicates, through the RRC signalling, whether the receiver is a potential virtual identification signalling user, performs blind detection for received DCI by $\log_2 N$ bits when the receiver is a potential virtual identification user, and performs blind detection for the DCI by 0 bit when the receiver is not a potential virtual identification user;

the receiver determines the virtual identification signalling according to the virtual identification index signalling obtained through the blind detection, and generates the scrambling code sequence of the demodulation pilot according to the virtual identification signalling, wherein N is the number of virtual cell identifications in the virtual identification signalling.

In the method above, when the scrambling code identification signalling group includes the virtual identification signalling and the virtual identification index signalling, the step that the network side transmits the scrambling code identification signalling group to the receiver, and the receiver generates, according to the scrambling code identification signalling group, the corresponding scrambling code sequence of the DMRS may include:

the network side transmits the virtual identification signalling to the receiver via an SIB or an RRC signalling, and the receiver stores the virtual identification signalling in the received SIB or RRC signalling;

the receiver performs blind detection for DCI by 1 bit or $\log_2 N$ bits, determines the virtual identification signalling according to the virtual identification index signalling obtained through the blind detection, and generates, the scrambling code sequence of the demodulation pilot according to the virtual identification signalling.

In the method above, the SIB may be SIB2, SIB3, SIB4, SIB5, SIB13 or SIB14.

In the method above, when the scrambling code identification signalling group includes the virtual identification index signalling, the step that the terminal side generates the corresponding scrambling code sequence of the demodulation pilot according to the scrambling code identification signalling group includes:

the receiver obtains the virtual identification signalling, performs blind detection for DCI by $\log_2 N$ bits or 1 bit, determines the virtual identification signalling according to the virtual identification index signalling obtained through the blind detection, and generates the scrambling code sequence of the demodulation pilot according to the virtual identification signalling.

In the method above, when the scrambling code identification signalling group includes the virtual identification enabling signalling and the virtual identification index signalling, the step that the network side transmits the scrambling code identification signalling group to the receiver, and the receiver generates the corresponding scrambling code sequence of the demodulation pilot according to the scrambling code identification signalling group may include:

the receiver obtains the virtual identification signalling and stores the obtained virtual identification signalling;

the network side indicates, through an RRC signalling, whether the receiver is a potential virtual identification signalling user, performs blind detection for DCI by 1 bit when the receiver is a potential virtual identification user, and performs blind detection for the DCI by 0 bit when the receiver is not a potential virtual identification user, the receiver determines the virtual identification signalling according to the virtual identification index signalling obtained through the blind detection, and generates the scrambling code sequence of the DMRS according to the virtual identification signalling.

In the method above, when the scrambling code identification signalling group includes the virtual identification enabling signalling and the virtual identification index signalling, the step that the terminal side generates the corresponding scrambling code sequence of the demodulation pilot according to the scrambling code identification signalling group may include:

the receiver obtains the virtual identification signalling and stores the obtained virtual identification signalling;

the network side indicates whether the receiver is a potential virtual identification signalling user through an RRC signalling, performs blind detection for DCI by $\log_2 N$ bits when the receiver is a potential virtual identification user, and performs blind detection for the DCI by 0 bit when the receiver is not a potential virtual identification user;

the receiver determines the virtual identification signalling according to the virtual identification index signalling obtained through the blind detection, and generates the scrambling code sequence of the DMRS according to the virtual identification signalling.

In the method above, the step that the receiver obtains the virtual identification signal may include:

the receiver calculates the virtual identification signalling directly or indirectly through other obtained parameters; the other obtained parameters include a $n_{SCID}$ parameter in DCI Format 2B, a $n_{SCID}$ parameter in DCI Format 2C or a $n_{SCID}$ parameter in new DCI, wherein when calculating by using $n_{SCID}$, the value of N is 1.

The disclosure further provides a system for notification of scrambling code identification signalling group. The system includes: a network side, and a receiver, wherein the network side is configured to transmit a scrambling code identification signalling group to the receiver;

the receiver is configured to generate, according to the scrambling code identification signalling group, a corresponding scrambling code sequence of a demodulation pilot, generate a pilot symbol sequence according to the scrambling code sequence of the demodulation pilot, and perform channel estimation according to the pilot symbol sequence.

In the system above, the scrambling code identification signalling group may include a virtual identification signalling, and/or a virtual identification enabling signalling and/or a virtual identification index signalling.

According to a method and system for notification of scrambling code identification signalling group of the disclosure, a network side transmits a scrambling code identification signalling group to a receiver; the receiver generates a corresponding scrambling code sequence of a demodulation pilot according to the scrambling code identification signalling group, generates a pilot symbol sequence according to the scrambling code sequence of the demodulation pilot, and performs channel estimation according to the pilot symbol sequence. Therefore, the receiver can receive a virtual identification signalling sent by the network side, and generate the corresponding scrambling code sequence of the demodulation pilot according to the virtual identification signalling, so that the receiver obtains the scrambling code sequence of the DMRS which is the same as that of the network side, thus avoiding the problem that the receiver fails to estimate interference among receivers through DMRSs accurately because a plurality of cells of the network side use different virtual identification signallings.

BRIEF DESCRIPTION OF THE DRAWINGS

FIG. 1 is a flowchart for implementing a method for notification of scrambling code identification signalling group according to the present disclosure;

FIG. 2 is a flowchart of the first embodiment for implementing a method for notification of scrambling code identification signalling group according to the present disclosure;

DETAILED DESCRIPTION

Figure 3:
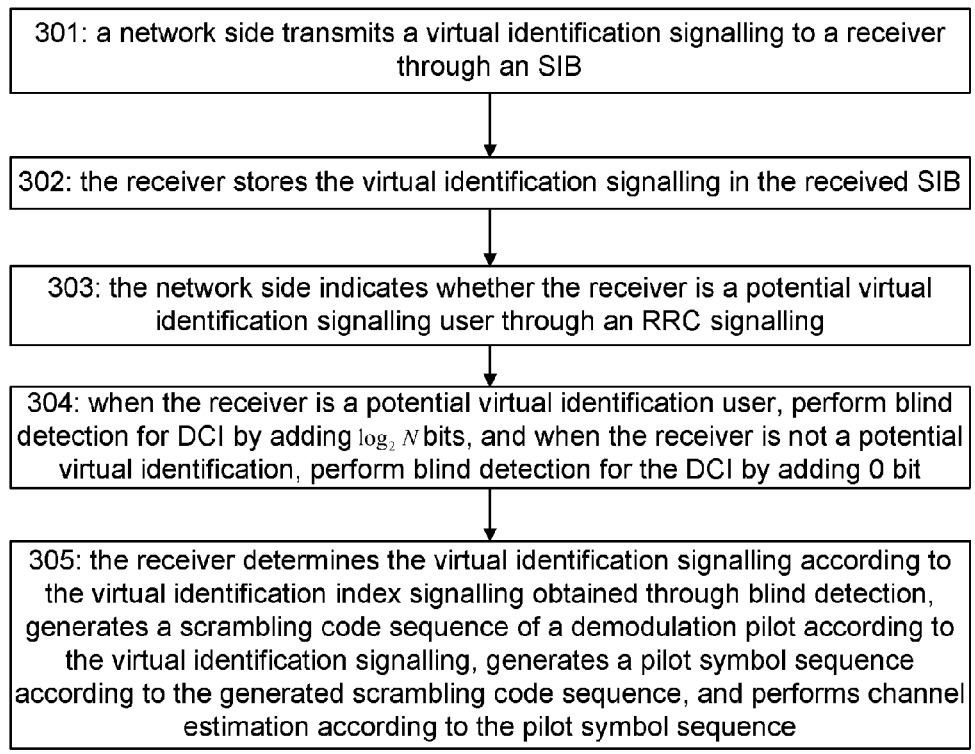
FIG. 3 is a flowchart of the second embodiment for implementing a method for notification of scrambling code identification signalling group according to the present disclosure.

A network side includes a macro base station, a micro base station, a relay base station and a HeNodeB etc. A receiver includes a mobile terminal, a user handheld device, a relay base station and a HeNodeB etc. Based on the above network side and the receiver, the present disclosure provides a method for notification of scrambling code identification signalling group, and the basic idea of the method is that: the network side transmits a scrambling code identification signalling group to the receiver; the receiver generates a corresponding scrambling code sequence of a demodulation pilot according to the scrambling code identification signalling group, generates a pilot symbol sequence according to the scrambling code sequence of the demodulation pilot, and performs channel estimation according to the pilot symbol sequence.

The present disclosure will be further described in details below through the accompanying drawings and specific embodiments.

FIG. 1 is a flowchart for implementing a method for notification of scrambling code identification signalling group according to the present disclosure. As shown in FIG. 1, the method includes the following steps:

Step 101: a network side transmits a scrambling code identification signalling group to a receiver;

specifically, the network side transmits the scrambling code identification signalling group to the receiver. The scrambling code identification signalling group includes a virtual identification signalling, and/or a virtual identification enabling signalling and/or a virtual identification index signalling, wherein in the present disclosure, the virtual identification signalling includes a virtual cell identification and/or a receiver-dedicated virtual sequence identification signalling. The network side will transmit the scrambling code identification signalling group to the receiver via a System Information Block (SIB) or a Radio Resource Control (RRC) signalling, wherein the SIB may use SIB2, SIB3, SIB4, SIB5, SIB13 or SIB14; the virtual identification signalling is a constant fixedly used in a standard, or a value identification calculated through other known parameters.

Step 102: the receiver generates a corresponding scrambling code sequence of a demodulation pilot according to the scrambling code identification signalling group, generates a pilot symbol sequence according to the generated scrambling code sequence, and performs channel estimation according to the pilot symbol sequence.

specifically, when the virtual identification enabling signalling is received, the receiver performs blind detection for the virtual identification signalling through the virtual identification index signalling according to the virtual identification enabling signalling, determines whether the virtual identification signalling or a serving cell identification is used, generates the scrambling code sequence of the demodulation reference signal and/or demodulation pilot according to the virtual identification signalling or the serving cell identification signalling, generates the pilot symbol sequence according to the generated scrambling code sequence, and performs channel estimation according to the pilot symbol sequence.

Embodiment 1

FIG. 2 is a flowchart of the first embodiment for implementing a method for notification of scrambling code identification signalling group according to the present disclosure. As shown in FIG. 2, the embodiment includes the following steps:

Step 201: a network side transmits a virtual identification signalling to a receiver through an SIB;

specifically, the network side transmits, through the SIB, the virtual identification signalling to a receiver which is able to identify such a signalling, wherein the virtual identification signalling may include a virtual cell identification and the virtual identification signalling may include one or more virtual cell identifications. In the present embodiment, the SIB may be SIB2, SIB3, SIB4, SIB5, SIB13 or SIB14.

Step 202: the receiver stores the virtual identification signalling in the received SIB;

specifically, the receiver receives, on a corresponding subframe, the virtual identification signalling sent by the network side through the SIB; the physical layer of the receiver performs a series of processing for the virtual identification signalling, and the processed and decoded virtual identification signalling is transmitted to a higher layer of the receiver finally; meanwhile, the receiver may obtain the virtual identification signalling from the SIB, store the virtual identification signalling and update the virtual identification signalling according to an updating period of the SIB; the receiver storing the virtual identification signalling becomes a possible receiver which generates, according to the virtual identification signalling, a scrambling code sequence of a demodulation pilot.

Step 203: the network side indicates whether the receiver is a potential virtual identification signalling user through an RRC signalling;

specifically, when the receiver satisfies a certain condition, the network side determines whether the receiver needs to become a potential virtual identification signalling user according to a channel environment where the receiver is located, and notifies, through the RRC signalling, a determining result to notify whether the receiver needs to become a potential virtual identification signalling user; when the RRC signalling carries a virtual identification enabling signalling, the receiver can learn the determining result through identifying an identification of the virtual identification enabling signalling; in the present embodiment, the virtual identification enabling signalling in the RRC signalling is 1 bit, and a value represented by the 1 bit is 0, 1, Enable or Disable enumeration; for example, the certain condition may be a reference signal receiving power, i.e. when the reference signal receiving power of the receiver satisfies a set threshold, the network side determines whether the receiver needs to become a potential virtual identification signalling user according to the channel environment where the receiver is located;

Step 204: when the receiver is a potential virtual identification user, perform blind detection for DCI by 1 bit; when the receiver is not a potential virtual identification user, perform blind detection for the DCI by 0 bit;

specifically, the receiver receives Downlink Control Information (DCI) transmitted by the network side. The DCI includes a virtual identification index signalling in the present embodiment, the receiver determines, according to the Virtual Identification enabling signalling, to perform blind detection for the DCI by a 1-bit extension length or according to a normal length, i.e. in a format of DCI Format 2B or DCI Format 2C or a future format of the DCI, the virtual identification signalling is increased by 0 bit or 1 bit: wherein when the value of the virtual identification enabling signalling is 0 or Disable, the receiver is not a potential virtual identification user and blind detection is performed for the DCI by 0 bit, i.e. the blind detection is performed for the DCI according to a normal length; when the value of the virtual identification enabling signalling is 1 or Enable, the receiver is a potential virtual identification user and the receiver performs blind detection for the DCI by a 1-bit extension length.

Step 205: the receiver determines the virtual identification signalling according to the virtual identification index signalling obtained through blind detection, generates a scrambling code sequence of a demodulation pilot according to the virtual identification signalling, generates a pilot symbol sequence according to the generated scrambling code sequence, and performs channel estimation according to the pilot symbol sequence;

specifically, when the receiver detects that the length of the DCI after blind detection is a normal length, the receiver generates the scrambling code sequence of the demodulation pilot according to a serving cell identification, wherein an initial factor of the generated scrambling code sequence of the demodulation pilot is: $c_{init}=(n_s/2+1)\cdot(2N_{ID}^{cell}+1)\cdot 2^{16}+n_{SCID}$, where $n_s$ is a time slot index in a wireless frame and a range of values is: $n_s=\{0, 1, 2, 3 \ldots, 19\}$, $N_{ID}^{cell}$ is a notified serving cell identification, and $n_{SCID}$ is a receiver identification-related parameter; the pilot symbol sequence is generated according to a scrambling code sequence generating method, and a pilot sequence generating method in the 3rd Generation Partnership Project (3GPP) RAN1 36.211 protocol; a received signal is demodulated, i.e. the channel estimation is performed by using the generated pilot symbol sequence and the received signal. The received signal is a demodulation reference signal;

or when the receiver detects that the length of the DCI after blind detection is an extension length, the receiver generates the scrambling code sequence of the demodulation pilot according to the virtual identification signalling, wherein an initial factor of the generated scrambling code sequence of the demodulation pilot is: $c_{init}=(n_s/2+1)\cdot(2N_{ID}^{virtual}+1)\cdot 2^{16}+n_{SCID}$, where $n_s$ is a time slot index in a wireless frame and a range of values is $n_s=\{0, 1, 2, 3 \ldots, 19\}$, $N_{ID}^{virtual}$ is the virtual identification signalling stored by the receiver, and $n_{SCID}$ is a receiver identification-related parameter; the pilot symbol sequence is generated according to a scrambling code sequence generating method, and a pilot sequence generating method in the 3GPP RAN1 36.211 protocol; a received signal is demodulated, i.e. the channel estimation is performed by using the generated pilot symbol sequence and the received signal. The received signal is a demodulation reference signal.

Embodiment 2

FIG. 3 is a flowchart of the second embodiment for implementing a method for notification of scrambling code identification signalling group according to the present disclosure. As shown in FIG. 3, the present embodiment includes the following steps:

Step 301 to Step 303 are the same as Step 201 to Step 203;

Step 304: when the receiver is a potential virtual identification user, perform blind detection for DCI by $\log_2 N$ bits; when the receiver is not a potential virtual identification, perform blind detection for the DCI by 0 bit;

specifically, the receiver receives DCI transmitted by the network side. The DCI includes a virtual identification index signalling in the present embodiment; the receiver determines, according to the virtual identification enabling signalling, to perform blind detection for the DCI by $\log_2$ N-bit extension length or according to a normal length, i.e. in a format of DCI Format 2B or DCI Format 2C or a future format of the DCI, the virtual identification index signalling is increased by 0 bit or $\log_2 N$ bits, where N is the number of virtual cell identifications in the virtual identification signalling, wherein when the value of the virtual identification enabling signalling is 0 or Disable, the receiver is not a potential virtual identification user and blind detection is performed for the DCI by 0 bit, i.e. the blind detection is performed for the DCI according to a normal length; when the value of the virtual identification enabling signalling is 1 or Enable, the receiver is a potential virtual identification user and the receiver performs blind detection for the DCI by a $\log_2 N$-bit extension length.

Step 305: the receiver determines the virtual identification signalling according to the virtual identification index signalling obtained through blind detection, generates a scrambling code sequence of a demodulation pilot according to the virtual identification signalling, generates a pilot symbol sequence according to the generated scrambling code sequence, and performs channel estimation according to the pilot symbol sequence;

specifically, when the receiver detects that the length of the DCI after blind detection is a normal length, the receiver generates the scrambling code sequence of the demodulation pilot according to a serving cell identification, wherein an initial factor of the generated scrambling code sequence of the demodulation pilot is: $c_{init}=(n_s/2+1)\cdot(2N_{ID}^{cell}+1)\cdot 2^{16}+n_{SCID}$, where $n_s$ is a time slot index in a wireless frame and a range of values is: $n_s=\{0, 1, 2, 3 \ldots, 19\}$, $N_{ID}^{cell}$ is a notified serving cell identification, and $n_{SCID}$ is a receiver identification-related parameter; the pilot symbol sequence is generated according to a scrambling code sequence generating method, and a pilot sequence generating method in the 3GPP RAN1 36.211 protocol; a received signal is demodulated, i.e. the channel estimation is performed by using the generated pilot symbol sequence and the received signal. The received signal is a demodulation reference signal;

or when the receiver detects that the length of the DCI after blind detection is an extension length, the receiver generates the scrambling code sequence of the demodulation pilot according to the virtual identification signalling, wherein an initial factor of the generated scrambling code sequence of the demodulation pilot is: $c_{init}=(n_s/2+1)\cdot(2N_{ID}^{virtual}+1)\cdot 2^{16}+n_{SCID}$, where $n_s$ is a time slot index in a wireless frame and a range of values is $n_s=\{0, 1, 2, 3 \ldots, 19\}$, $N_{ID}^{virtual}$ is the virtual identification signalling stored by the receiver, and $n_{SCID}$ is a receiver identification-related parameter; the pilot symbol sequence is generated according to a scrambling code sequence generating method, and a pilot sequence generating method in the 3GPP RAN1 36.211 protocol; a received signal is demodulated, i.e. the channel estimation is performed by using the generated pilot symbol sequence and the received signal. The received signal is a demodulation reference signal.

Embodiment 3

Figure 4:
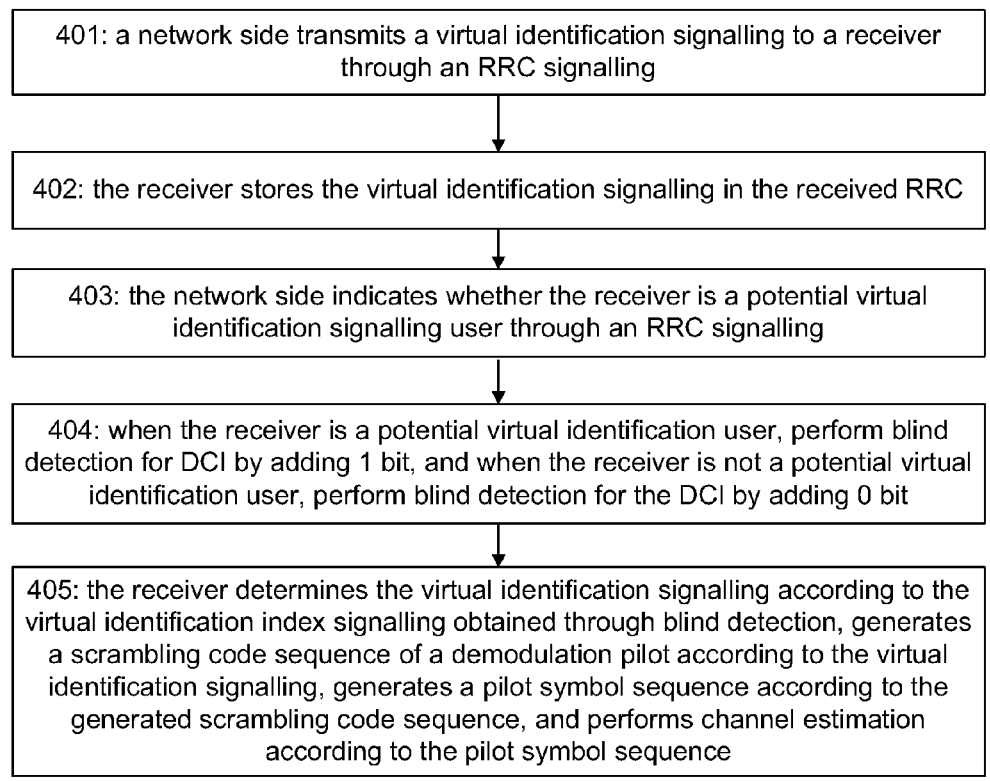
FIG. 4 is a flowchart of the third embodiment for implementing a method for notification of scrambling code identification signalling group according to the present disclosure.

FIG. 4 is a flowchart of the third embodiment for implementing a method for notification of scrambling code identification signalling group according to the present disclosure. As shown in FIG. 4, the present embodiment includes the following steps:

Step 401: a network side transmits a virtual identification signalling to a receiver through an RRC signalling;

specifically, the network side transmits, through the RRC signalling, the virtual identification signalling to a receiver which is able to identify such a signalling, wherein the virtual identification signalling may include a virtual cell identification and the virtual identification signalling may include one or more virtual cell identifications;

Step 402: the receiver stores the virtual identification signalling in the received RRC;

specifically, the receiver receives, on a corresponding subframe, the virtual identification signalling sent by the network side through the RRC signalling; the physical layer of the receiver performs a series of processing for the virtual identification signalling, and the processed and decoded virtual identification signalling is transmitted to a higher layer of the receiver finally; meanwhile, the receiver may obtain the virtual identification signalling from the RRC signalling, and store the virtual identification signalling; the receiver storing the virtual identification signalling becomes a possible receiver which generates a scrambling code sequence of a demodulation pilot according to the virtual identification signalling.

Step 403 to Step 405 are the same as Step 203 to Step 205.

Embodiment 4

Figure 5:
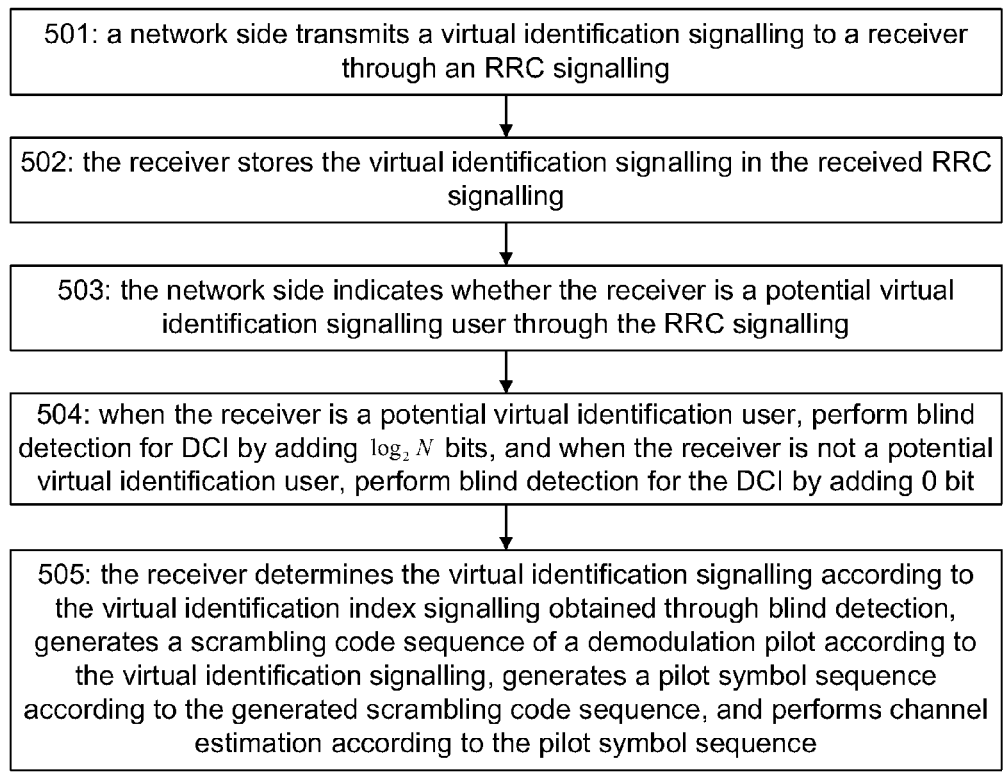
FIG. 5 is a flowchart of the fourth embodiment for implementing a method for notification of scrambling code identification signalling group according to the present disclosure.

FIG. 5 is a flowchart of the fourth embodiment for implementing a method for notification of scrambling code identification signalling group according to the present disclosure. As shown in FIG. 5, the present embodiment includes the following steps:

Step 501: a network side transmits a virtual identification signalling to a receiver through an RRC signalling;

specifically, the network side transmits, through the RRC signalling, the virtual identification signalling to a receiver which is able to identify such a signalling, wherein the virtual identification signalling may include a virtual cell identification and the virtual identification signalling may include one or more virtual cell identifications;

Step 502: the receiver stores the virtual identification signalling in the received RRC signalling;

specifically, the receiver receives, on a corresponding subframe, the virtual identification signalling sent by the network side through the RRC signalling; the physical layer of the receiver performs a series of processing for the virtual identification signalling, and the processed and decoded virtual identification signalling is transmitted to a higher layer of the receiver finally; meanwhile, the receiver may obtain the virtual identification signalling from the RRC signalling, and store the virtual identification signalling; the receiver storing the virtual identification signalling becomes a possible receiver which generates a scrambling code sequence of a demodulation pilot according to the virtual identification signalling;

Step 503: the network side indicates, through the RRC signalling, whether the receiver is a potential virtual identification signalling user;

specifically, when the receiver satisfies a certain condition, the network side determines whether the receiver needs to become a potential virtual identification signalling user according to a channel environment where the receiver is located, and notifies, through the RRC signalling, a determining result to notify whether the receiver needs to become a potential virtual identification signalling use; when the RRC signalling carries a virtual identification enabling signalling, the receiver can learn the determining result through identifying an identification of the virtual identification enabling signalling; in the present embodiment, the virtual identification enabling signalling in the RRC signalling is 1 bit, and a value represented by the 1 bit is 0, 1, Enable or Disable enumeration; for example, the certain condition may be a reference signal receiving power, i.e. when the reference signal receiving power of the receiver satisfies a set threshold, the network side determines whether the receiver needs to become a potential virtual identification signalling user according to the channel environment where the receiver is located;

Step 504: when the receiver is a potential virtual identification user, perform blind detection for DCI by $\log_2 N$ bits; when the receiver is not a potential virtual identification user, perform blind detection for the DCI by 0 bit;

specifically, the receiver receives DCI transmitted by the network side. The DCI includes a virtual identification index signalling, in the present embodiment, the receiver determines, according to the virtual identification enabling signalling, to
perform blind detection for the DCI by a $\log_2$ N-bit extension length or according to a normal length, i.e. in a format of DCI Format 2B or DCI Format 2C or a future format of the DCI, the virtual identification signalling is increased by 0 bit or $\log_2$ N bits, where N is the number of virtual cell identifications in the virtual identification signalling, wherein when the value of the virtual identification enabling signalling is 0 or Disable, the receiver is not a potential virtual identification user and blind detection is performed for the DCI by 0 bit, i.e. the receiver performs the blind detection for the DCI according to a normal length, when the value of the virtual identification enabling signalling is 1 or Enable, the receiver is a potential virtual identification user and the receiver performs blind detection for the DCI by a $\log_2$ N-bit extension length.

Step 505: the receiver determines the virtual identification signalling according to the virtual identification index signalling obtained through blind detection, generates a scrambling code sequence of a demodulation pilot according to the virtual identification signalling, generates a pilot symbol sequence according to the generated scrambling code sequence, and performs channel estimation according to the pilot symbol sequence;

specifically, when the receiver detects that the length of the DCI after blind detection is a normal length, the receiver generates the scrambling code sequence of the DMRS according to a serving cell identification, wherein an initial factor of the generated scrambling code sequence of the demodulation pilot is: $c_{init}=(n_s/2+1)\cdot(2N_{ID}^{cell}+1)\cdot 2^{16}+n_{SCID}$, where $n_s$ is a time slot index in a wireless frame and a range of values is: $n_s=\{0, 1, 2, 3 \ldots, 19\}$, $N_{ID}^{cell}$ is a notified serving cell identification, and $n_{SCID}$ is a receiver identification-related parameter; the pilot symbol sequence is generated according to a scrambling code sequence generating method, and a pilot sequence generating method in the 3GPP RAN1 36.211 protocol; a received signal is demodulated, i.e. the channel estimation is performed by using the generated pilot symbol sequence and the received signal. The received signal is a demodulation reference signal;

or when the receiver detects that the length of the DCI after blind detection is an extension length, the receiver generates the scrambling code sequence of the demodulation pilot according to the virtual identification signalling, wherein an initial factor of the generated scrambling code sequence of the demodulation pilot is: $c_{init}=(n_s/2+1)\cdot(2N_{ID}^{virtual}+1)\cdot 2^{16}+n_{SCID}$, where $n_s$ is a time slot index in a wireless frame and a range of values is $n_s=\{0, 1, 2, 3 \ldots, 19\}$, $N_{ID}^{virtual}$ is the virtual identification signalling stored by the receiver, and $n_{SCID}$ is a receiver identification-related parameter; the pilot symbol sequence is generated according to a scrambling code sequence generating method, and a pilot sequence generating method in the 3GPP RAN1 36.211 protocol; a received signal is demodulated, i.e. the channel estimation is performed by using the generated pilot symbol sequence and the received signal. The received signal is a demodulation reference signal.

Embodiment 5

Figure 6:
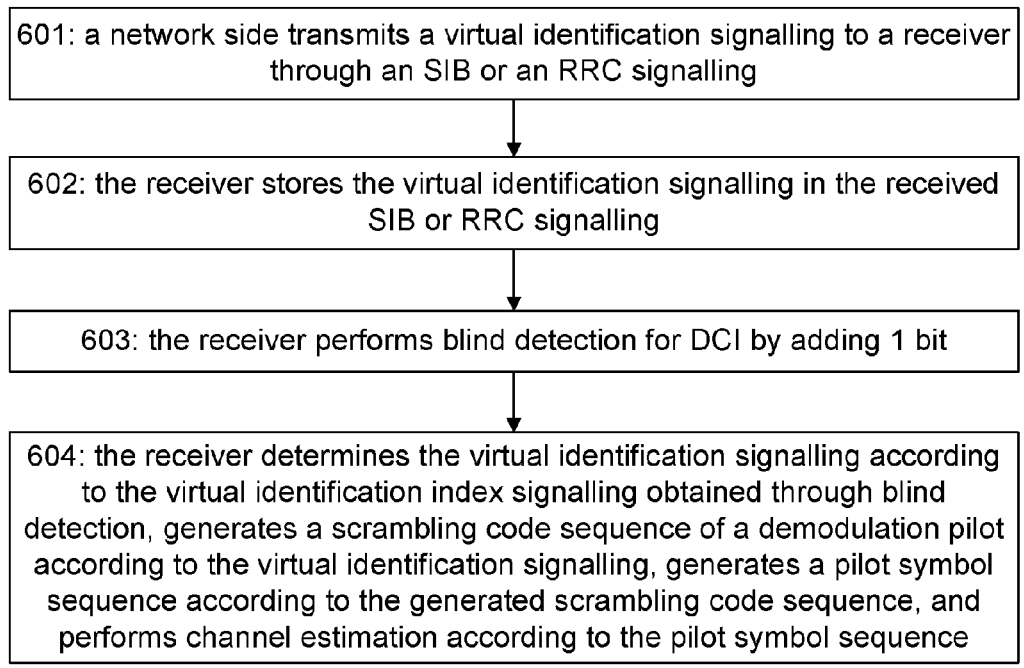
FIG. 6 is a flowchart of the fifth embodiment for implementing a method for notification of scrambling code identification signalling group according to the present disclosure.

FIG. 6 is a flowchart of the fifth embodiment for implementing a method for notification of scrambling code identification signalling group according to the present disclosure. As shown in FIG. 6, the present embodiment includes the following signalling steps:

Step 601: a network side transmits a virtual identification to a receiver through an SIB or an RRC signalling;

specifically, the network side transmits, through the SIB or the RRC signalling, the virtual identification signalling to a receiver which is able to identify such a signalling, wherein the virtual identification signalling may include a virtual cell identification and the virtual identification signalling may include one or more virtual cell identifications. In the present embodiment, the SIB may be SIB2, SIB3, SIB4, SIB5, SIB13 or SIB14;

Step 602: the receiver stores the virtual identification signalling in the received SIB or RRC signalling;

specifically, the receiver receives, on a corresponding subframe, the virtual identification signalling sent by the network side through the SIB or the RRC signalling; the physical layer of the receiver performs a series of processing for the virtual identification signalling, and the processed and decoded virtual identification signalling is transmitted to a higher layer of the receiver finally; meanwhile, the receiver may obtain the virtual identification signalling from the SIB or the RRC signalling, store the virtual identification signalling and update the virtual identification signalling according to an updating period of the SIB or the RRC signalling; the receiver storing the virtual identification signalling becomes a possible receiver which generates a scrambling code sequence of a demodulation pilot according to the virtual identification signalling;

Step 603: the receiver performs blind detection for DCI by 1 bit;

specifically, the receiver receives DCI transmitted by the network side. The DCI includes a virtual identification index signalling. In the present embodiment, the receiver determines to perform blind detection for the DCI by a 1-bit extension length, i.e. in a format of DCI Format 2B or DCI Format 2C or a future format of the DCI, the virtual identification signalling is increased by 1 bit.

Step 604: the receiver determines the virtual identification signalling according to the virtual identification index signalling obtained through blind detection, generates a scrambling code sequence of a demodulation pilot according to the virtual identification signalling, generates a pilot symbol sequence according to the generated scrambling code sequence, and performs channel estimation according to the pilot symbol sequence;

specifically, when the value of the virtual identification index signalling is 0, the receiver generates the scrambling code sequence of the demodulation pilot according to a serving cell identification, wherein an initial factor of the generated scrambling code sequence of the demodulation pilot is: $c_{init}=(n_s/2+1)\cdot(2N_{ID}^{cell}+1)\cdot 2^{16}+n_{SCID}$, where $n_s$ is a time slot index in a wireless frame and a range of values is: $n_s=\{0, 1, 2, 3 \ldots, 19\}$, $N_{ID}^{cell}$ is a notified serving cell identification, and $n_{SCID}$ is a receiver identification-related parameter; the pilot symbol sequence is generated according to a scrambling code sequence generating method, and a pilot sequence generating method in the 3GPP RAN1 36.211 protocol; a received signal is demodulated, i.e. the channel estimation is performed by using the generated pilot symbol sequence and the received signal.

when the value of the virtual identification index signalling is not 0, the receiver generates the scrambling code sequence of the demodulation pilot according to the virtual identification signalling, wherein an initial factor of the generated scrambling code sequence of the demodulation pilot is: $c_{init}=(n_s/2+$ $1) \cdot (2N_{ID}^{virtual}+1) \cdot 2^{16}+n_{SCID}$, where $n_s$ is a time slot index in a wireless frame and a range of values is $n_s=\{0, 1, 2, 3 \ldots, 19\}$, $N_{ID}^{virtual}$ is a notified virtual identification, and $n_{SCID}$ is a receiver identification-related parameter; the pilot symbol sequence is generated according to a scrambling code sequence generating method, and a pilot sequence generating method in the 3GPP RAN1 36.211 protocol; a received signal is demodulated, i.e. the channel estimation is performed by using the generated pilot symbol sequence and the received signal. The received signal is a demodulation reference signal.

Embodiment 6

Figure 7:
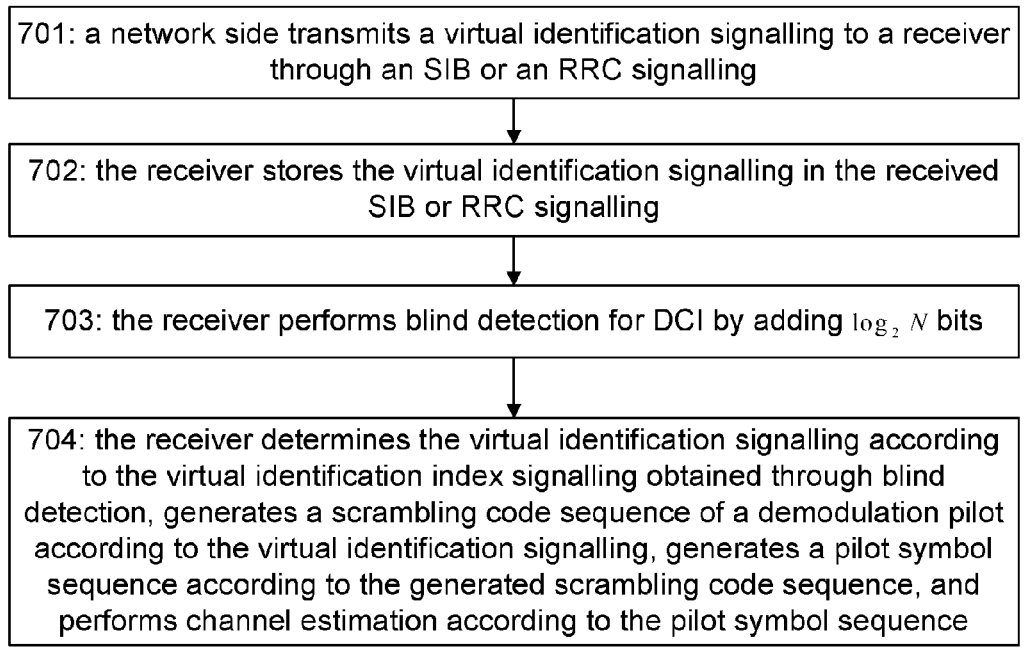
FIG. 7 is a flowchart of the sixth embodiment for implementing a method for notification of scrambling code identification signalling group according to the present disclosure.

FIG. 7 is a flowchart of the sixth embodiment for implementing a method for notification of scrambling code identification signalling group according to the present disclosure. As shown in FIG. 7, the present embodiment includes the following steps:

Step 701 to Step 702 are the same as Step 601 to Step 602.

Step 703: the receiver performs blind detection for DCI by $\log_2 N$ bits; specifically, the receiver receives DCI transmitted by the network side. The DCI includes a virtual identification index signalling. In the present embodiment, the receiver determines to perform blind detection for the DCI by a $\log_2$ N-bit extension length, i.e. in a format of DCI Format 2B or DCI Format 2C or a future format of the DCI the virtual identification signalling is increased by $\log_2 N$ bits;

Step 704: the receiver determines the virtual identification signalling according to the virtual identification index signalling obtained through blind detection, generates a scrambling code sequence of a demodulation pilot according to the virtual identification signalling, generates a pilot symbol sequence according to the generated scrambling code sequence, and performs channel estimation according to the pilot symbol sequence;

specifically, when the receiver detects that the virtual identification index signalling is a serving cell identification index, the receiver generates the scrambling code sequence of the demodulation pilot according to a serving cell identification, wherein an initial factor of the generated scrambling code sequence of the demodulation pilot is: $c_{init}=(n_s/2+1) \cdot (2N_{ID}^{cell}+1) \cdot 2^{16}+n_{SCID}$, where $n_s$ is a time slot index in a wireless frame and a range of values is: $n_s=\{0, 1, 2, 3 \ldots, 19\}$, $N_{ID}^{cell}$ is a notified serving cell identification, and $n_{SCID}$ is a receiver identification-related parameter; the pilot symbol sequence is generated according to a scrambling code sequence generating method, and a pilot sequence generating method in the 3GPP RAN1 36.211 protocol; a received signal is demodulated, i.e. the channel estimation is performed by using the generated pilot symbol sequence and the received signal;

when the receiver detects that the virtual identification index signalling is not a serving cell identification index, the receiver generates the scrambling code sequence of the demodulation pilot according to the virtual identification signalling, wherein an initial factor of the generated scrambling code sequence of the demodulation pilot is: $c_{init}=(n_s/2+1) \cdot (2N_{ID}^{virtual}+1) \cdot 2^{16}+n_{SCID}$, where $n_s$ is a time slot index in a wireless frame and a range of values is $n_s=\{0, 1, 2, 3 \ldots, 19\}$, $N_{ID}^{virtual}$ is a notified virtual identification, and $n_{SCID}$ is a receiver identification-related parameter; the pilot symbol sequence is generated according to a scrambling code sequence generating method, and a pilot sequence generating method in the 3GPP RAN1 36.211 protocol; a received signal is demodulated, i.e. the channel estimation is performed by using the generated pilot symbol sequence and the received signal. The received signal is a demodulation reference signal.

Embodiment 7

Figure 8:
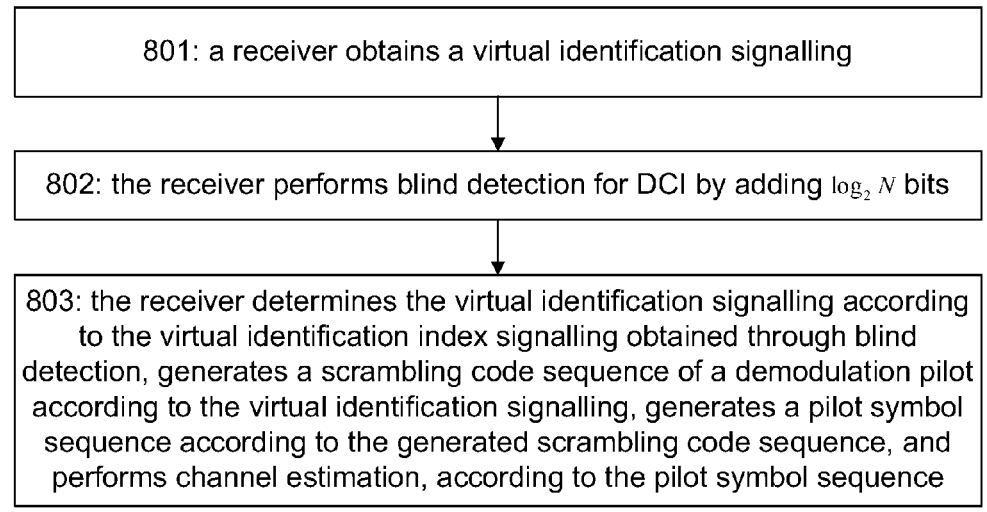
FIG. 8 is a flowchart of the seventh embodiment for implementing a method for notification of scrambling code identification signalling group according to the present disclosure.

FIG. 8 is a flowchart of the seventh embodiment for implementing a method for notification of scrambling code identification signalling group according to the present disclosure. As shown in FIG. 8, the present embodiment includes the following steps:

Step 801: a receiver obtains a virtual identification signalling;

specifically, the receiver obtains the virtual identification signalling of a network side according to a physical cell identification sent by the network side, or other known control information, or standard and fixed virtual identification configuration applicable to the network side and the receiver, wherein the virtual identification signalling may include a virtual cell identification and the virtual identification signalling may include one or more virtual cell identifications;

Step 802: the receiver performs blind detection for DCI by $\log_2 N$ bits;

specifically, the receiver receives DCI transmitted by the network side. The DCI includes a virtual identification index signalling. In the present embodiment, the receiver determines, according to the virtual identification index signalling, to perform blind detection for the DCI by a $\log_2$ N-bit extension length, where N is the number of virtual cell identifications in the virtual identification signalling, i.e. in a format of DCI Format 2B or DCI Format 2C or a future format of the DCI, the virtual identification signalling is increased by $\log_2 N$ bits;

Step 803: the receiver determines the virtual identification signalling according to the virtual identification index signalling obtained through blind detection, generates a scrambling code sequence of a demodulation pilot according to the virtual identification signalling, generates a pilot symbol sequence according to the generated scrambling code sequence, and performs channel estimation according to the pilot symbol sequence;

specifically, when the receiver detects that the virtual identification index signalling is a serving cell identification index, the receiver generates the scrambling code sequence of the demodulation pilot according to a serving cell identification, wherein an initial factor of the generated scrambling code sequence of the demodulation pilot is: $c_{init}=(n_s/2+1) \cdot (2N_{ID}^{cell}+1) \cdot 2^{16}+n_{SCID}$, where $n_s$ is a time slot index in a wireless frame and a range of values is: $n_s=\{0, 1, 2, 3 \ldots, 19\}$, $N_{ID}^{cell}$ is a notified serving cell identification, and $n_{SCID}$ is a receiver identification-related parameter; the pilot symbol sequence is generated according to a scrambling code sequence generating method, and a pilot sequence generating method in the 3GPP RAN1 36.211 protocol; a received signal is demodulated, i.e. the channel estimation is performed by using the generated pilot symbol sequence and the received signal;

when the receiver detects that the virtual identification index signalling is not a serving cell identification index, the receiver generates the scrambling code sequence of the demodulation pilot according to the virtual identification signalling, wherein an initial factor of the generated scrambling code sequence of the demodulation pilot is: $c_{init}=(n_s/2+1) \cdot (2N_{ID}^{virtual}+1) \cdot 2^{16}+n_{SCID}$, where $n_s$ is a time slot index in a wireless frame and a range of values is $n_s=\{0, 1, 2, 3 \ldots, 19\}$, $N_{ID}^{virtual}$ is a notified virtual identification, and $n_{SCID}$ is a receiver identification-related parameter; the pilot symbol sequence is generated according to a scrambling code sequence generating method, and a pilot sequence generating method in the 3GPP RAN1 36.211 protocol; a received signal is demodulated, i.e. the channel estimation is performed by using the generated pilot symbol sequence and the received signal. The received signal is a demodulation reference signal.

Embodiment 8

Figure 9:
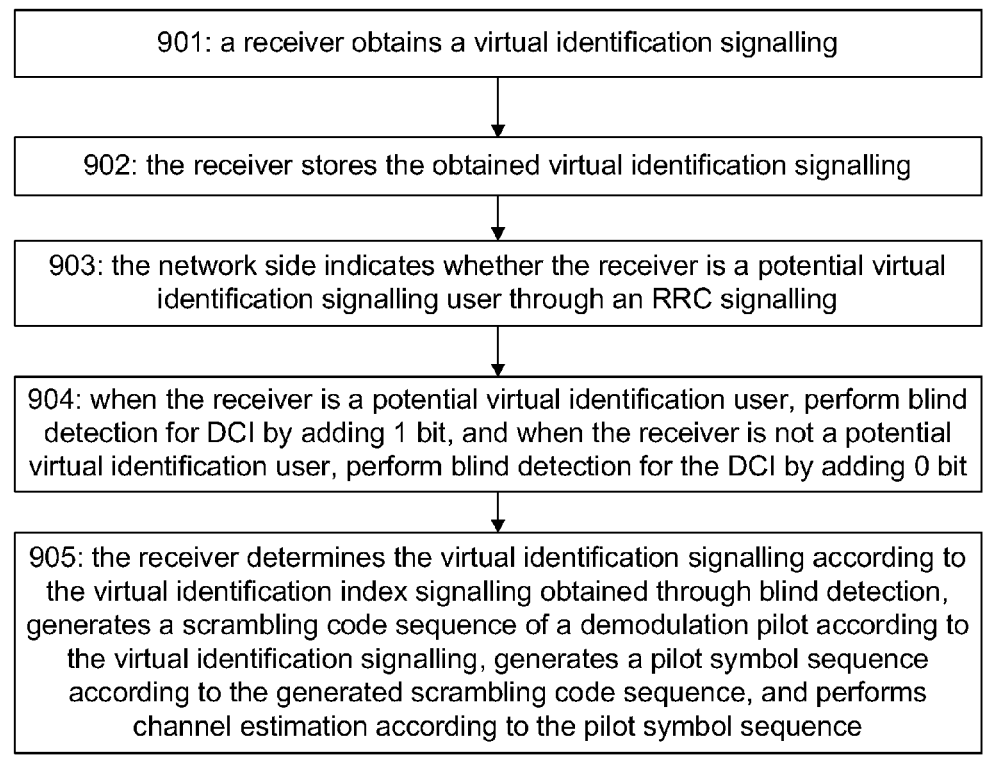
FIG. 9 is a flowchart of the eighth embodiment for implementing a method for notification of scrambling code identification signalling group according to the present disclosure.

FIG. 9 is a flowchart of the eighth embodiment for implementing a method for notification of scrambling code identification signalling group according to the present disclosure. As shown in FIG. 9, the present embodiment includes the following steps:

Step 901: a receiver obtains a virtual identification signalling;

specifically, the receiver obtains the virtual identification signalling of a network side according to a physical cell identification sent by the network side, or other known control information, or standard and fixed virtual identification configuration applicable to the network side or the receiver, wherein the virtual identification signalling may include a virtual cell identification and the virtual identification signalling may include one or more virtual cell identifications;

Step 902: the receiver stores the obtained virtual identification signalling;

specifically, the receiver stores the obtained virtual identification signalling, and the receiver storing the virtual identification signalling becomes a possible receiver which generates a scrambling code sequence according to the virtual identification signalling.

Step 903: the network side indicates, through an RRC signalling, whether the receiver is a potential virtual identification signalling user;

specifically, when the receiver satisfies a certain condition, the network side determines whether the receiver needs to become a potential virtual identification signalling user according to a channel environment where the receiver is located, and notifies, through the RRC signalling, a determining result to notify whether the receiver needs to become a potential virtual identification signalling user, wherein when the RRC signalling carries a virtual identification enabling signalling, the receiver can learn the determining result through identifying an identification of the virtual identification enabling signalling; in the present embodiment, the virtual identification enabling signalling in the RRC signalling is 1 bit, and a value represented by the 1 bit is 0, 1, Enable or Disable enumeration; for example, the certain condition may be a reference information signal receiving power, i.e. when the reference signal receiving power of the receiver satisfies a set threshold, the network side determines whether the receiver needs to become a potential virtual identification signalling user according to the channel environment where the receiver is located;

Step 904: when the receiver is a potential virtual identification user, perform blind detection for DCI by adding 1 bit; when the receiver is not a potential virtual identification user, perform blind detection for the DCI by 0 bit, Specifically, the receiver receives DCI transmitted by the network side. The DCI includes a virtual identification index signalling. In the present embodiment, the receiver determines, according to the virtual identification enabling signalling, to perform blind detection for the DCI by a 1-bit extension length or according to a normal length, i.e. in a format of DCI Format 2B or DCI Format 2C or a future format of the DCI, the virtual identification signalling is increased by 0 bit or 1 bit, wherein when the value of the virtual identification enabling signalling is 0 or Disable, the receiver is not a potential virtual identification user and blind detection is performed for the DCI by 0 bit, i.e. the blind detection is performed for the DCI according to a normal length; when the value of the virtual identification enabling signalling is 1 or Enable, the receiver is a potential virtual identification user and the receiver performs blind detection for the DCI by a 1-bit extension length.

Step 905: the receiver determines the virtual identification signalling according to the virtual identification index signalling obtained through blind detection, generates a scrambling code sequence of a demodulation pilot according to the virtual identification signalling, generates a pilot sequence according to the generated scrambling code sequence, and performs channel estimation according to the pilot symbol sequence;

specifically, when detecting that the length of the DCI after blind detection is a normal length, the receiver generates the scrambling code sequence of the demodulation pilot according to a serving cell identification, wherein an initial factor of the generated scrambling code sequence of the demodulation pilot is: $c_{init}=(n_s/2+1)\cdot(2N_{ID}^{cell}+1)\cdot 2^{16}+n_{SCID}$, where $n_s$ is a time slot index in a wireless frame and a range of values is: $n_s=\{0, 1, 2, 3 \ldots, 19\}$, $N_{ID}^{cell}$ is a notified serving cell identification, and $n_{SCID}$ is a receiver identification-related parameter; the pilot symbol sequence is generated according to a scrambling code sequence generating method, and a pilot sequence generating method in the 3GPP RAN1 36.211 protocol; a received signal is demodulated, i.e. the channel estimation is performed by using the generated pilot symbol sequence and the received signal. The received signal is a demodulation reference signal;

or when the receiver detects that the length of the DCI after blind detection is an extension length, the receiver generates the scrambling code sequence of the demodulation pilot according to the virtual identification signalling, wherein an initial factor of the generated scrambling code sequence of the demodulation pilot is: $c_{init}=(n_s/2+1)\cdot(2N_{ID}^{virtual}+1)\cdot 2^{16}+n_{SCID}$, where $n_s$ is a time slot index in a wireless frame and a range of values is $n_s=\{0, 1, 2, 3 \ldots, 19\}$, $N_{ID}^{virtual}$ is the virtual identification signalling stored by the receiver, and $n_{SCID}$ is a receiver identification-related parameter; the pilot symbol sequence is generated according to a scrambling code sequence generating method, and a pilot sequence generating method in the 3GPP RAN1 36.211 protocol; a received signal is demodulated, i.e. the channel estimation is performed by the generated pilot symbol sequence and the received signal. The received signal is a demodulation reference signal.

Embodiment 9

Figure 10:
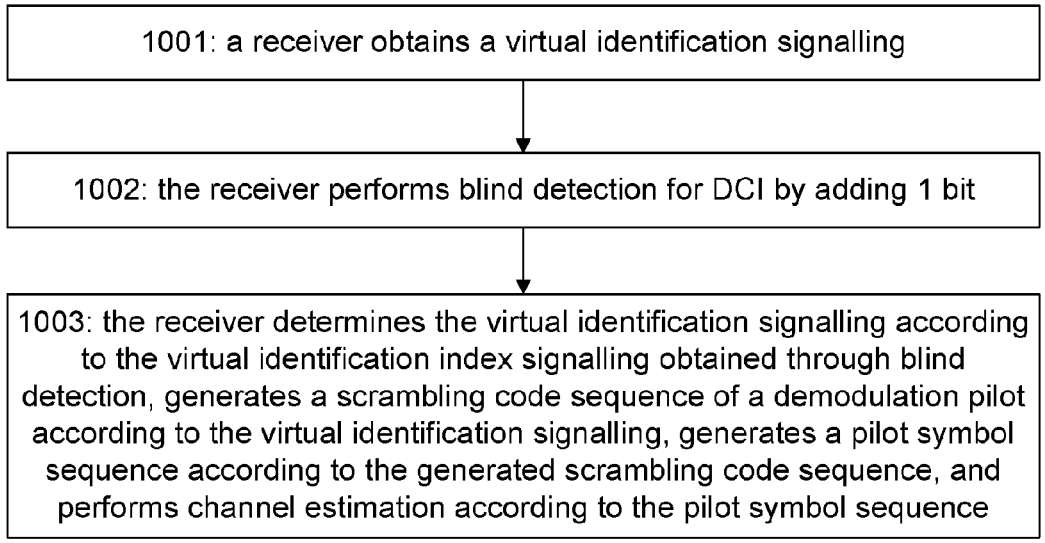
FIG. 10 is a flowchart of the ninth embodiment for implementing a method for notification of scrambling code identification signalling group according to the present disclosure.

FIG. 10 is a flowchart of the ninth embodiment for implementing a method for notification of scrambling code identification signalling group according to the present disclosure. As shown in FIG. 10, the present embodiment includes the following steps:

Step 1001: a receiver obtains a virtual identification signalling;

specifically, the receiver obtains the virtual identification signalling of a network side according to a physical cell identification sent by the network side, or other known control information, or standard and fixed virtual identification configuration applicable to the network side and the receiver, wherein the virtual identification signalling may include a virtual cell identification and the virtual identification signalling may include one or more virtual cell identifications;

Step 1002: the receiver performs blind detection for DCI by 1 bit;

Specifically, the receiver receives DCI transmitted by the network side. The DCI includes a virtual identification index signalling. In the present embodiment, the receiver determines, according to the virtual identification index signalling, to perform blind detection for the DCI by a 1-bit extension length, where N is the number of virtual cell identifications in the virtual identification signalling, i.e. in a format of DCI Format 2B or DCI Format 2C or a future format of the DCI, the virtual identification signalling is increased by 1 bit;

Step 1003: the receiver determines the virtual identification signalling according to the virtual identification index signalling obtained through blind detection, generates a scrambling code sequence of a demodulation pilot according to the virtual identification signalling, generates a pilot symbol sequence according to the generated scrambling code sequence, and performs channel estimation according to the pilot symbol sequence;

specifically, when detecting that the virtual identification index signalling is a serving cell identification index, the receiver generates the scrambling code sequence of the demodulation pilot according to a serving cell identification, wherein an initial factor of the generated scrambling code sequence of the demodulation pilot is: $c_{init}=(n_s/2+1) \cdot (2N_{ID}^{cell}+1) \cdot 2^{16}+n_{SCID}$, where $n_s$ is a time slot index in a wireless frame and a range of values is: $n_s=\{0, 1, 2, 3 \ldots, 19\}$, $N_{ID}^{cell}$ is a notified serving cell identification, and $n_{SCID}$ is a receiver identification-related parameter; the pilot symbol sequence is generated according to a scrambling code sequence generating method, and a pilot sequence generating method in the 3GPP RAN1 36.211 protocol; a received signal is demodulated, i.e. the channel estimation is performed by using the generated pilot symbol sequence and the received signal;

when the receiver detects that the virtual identification index signalling is not a serving cell identification index, the receiver generates the scrambling code sequence of the demodulation pilot according to the virtual identification signalling, wherein an initial factor of the generated scrambling code sequence of the demodulation pilot is: $c_{init}=(n_s/2+1) \cdot (2N_{ID}^{virtual}+1) \cdot 2^{16}+n_{SCID}$, where $n_s$ is a time slot index in a wireless frame and a range of values is $n_s=\{0, 1, 2, 3 \ldots, 19\}$, $N_{ID}^{virtual}$ is a notified virtual identification, and $n_{SCID}$ is a receiver identification-related parameter; the pilot symbol sequence is generated according to a scrambling code sequence generating method, and a pilot sequence generating method in the 3GPP RAN1 36.211 protocol; a received signal is demodulated, i.e. the channel estimation is performed by using the generated pilot symbol sequence and the received signal. The received signal is a demodulation reference signal.

Embodiment 10

Figure 11:
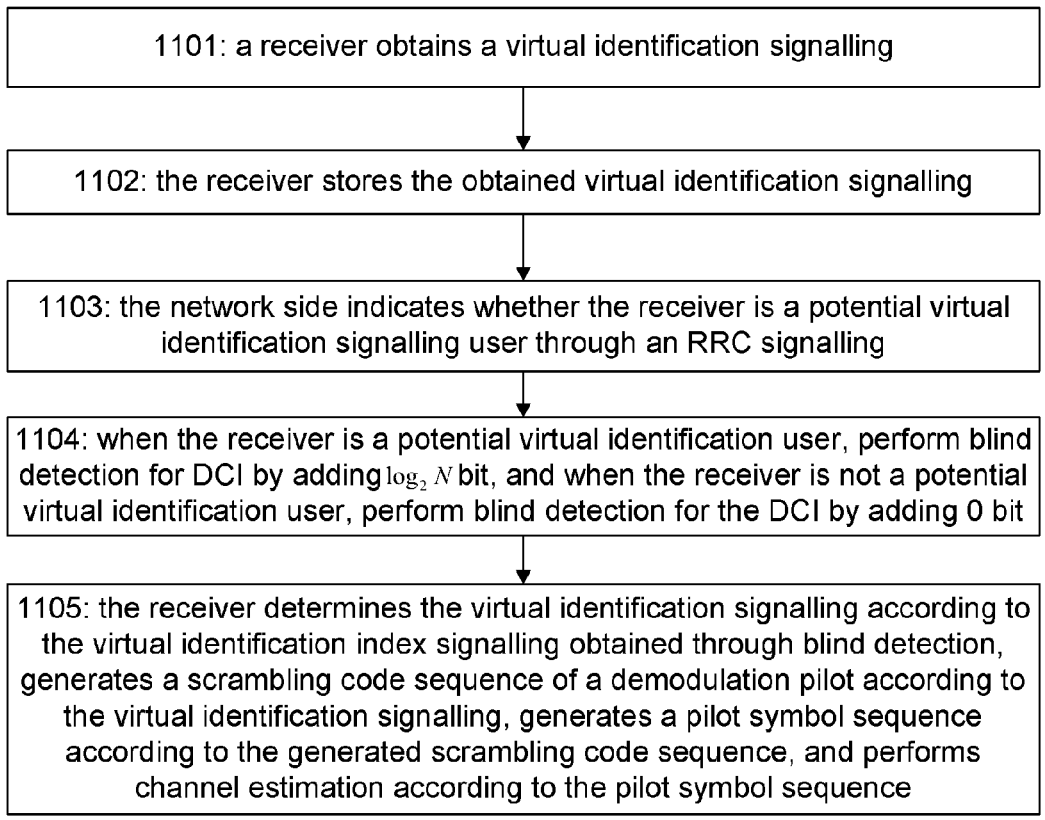
FIG. 11 is a flowchart of the tenth embodiment for implementing a method for notification of scrambling code identification signalling group according to the present disclosure.

FIG. 11 is a flowchart of the tenth embodiment for implementing a method for notification of scrambling code identification signalling group according to the present disclosure. As shown in FIG. 11, the present embodiment includes the following steps:

Step 1101: a receiver obtains a virtual identification signalling;

specifically, the receiver obtains the virtual identification signalling of a network side according to a physical cell identification sent by the network side, or other known control information, or standard and fixed virtual identification configuration applicable to the network side and the receiver, wherein the virtual identification signalling may include a virtual cell identification and the virtual identification signalling may include one or more virtual cell identifications;

Step 1102: the receiver stores the obtained virtual identification signalling;

Specifically, the receiver stores the obtained virtual identification signalling, and the receiver storing the virtual identification signalling becomes a possible receiver which generates a scrambling code sequence according to the virtual identification signalling;

Step 1103: the network side indicates, through an RRC signalling, whether the receiver is a potential virtual identification signalling user;

Specifically, when the receiver satisfies a certain condition, the network side determines whether the receiver needs to become a potential virtual identification signalling user according to a channel environment where the receiver is located, and notifies, through the RRC signalling, a determining result to notify whether the receiver needs to become a potential virtual identification signalling user, wherein when the RRC signalling carries a virtual identification enabling signalling, the receiver can learn the determining result through identifying an identification of the virtual identification enabling signalling; in the present embodiment, the virtual identification enabling signalling in the RRC signalling is 1 bit, and a value represented by the 1 bit is 0, 1, Enable or Disable enumeration; for example, the certain condition may be a reference information signal receiving power, i.e. when the reference signal receiving power of the receiver satisfies a set threshold, the network side determines whether the receiver needs to become a potential virtual identification signalling user according to the channel environment where the receiver is located;

Step 1104: when the receiver is a potential virtual identification user, perform blind detection for DCI by $\log_2 N$ bits; when the receiver is not a potential virtual identification user, perform blind detection for the DCI by 0 bit;

Specifically, the receiver receives DCI transmitted by the network side. The DCI includes a virtual identification index signalling. In the present embodiment, the receiver determines, according to the virtual identification enabling signalling, to perform blind detection for the DCI by a $\log_2$ N-bit extension length or according to a normal length, i.e. in a format of DCI Format 2B or DCI Format 2C or a future format of the DCI, the virtual identification signalling is increased by 0 bit or $\log_2$ N bits, wherein when the value of the virtual identification enabling signalling is 0 or Disable, the receiver is not a potential virtual identification user and blind detection is performed for the DCI by 0 bit, i.e. the blind detection is performed for the DCI according to a normal length when the value of the virtual identification enabling signalling is 1 or Enable, the receiver is a potential virtual identification user and the receiver performs Mind detection for the DCI by a $\log_2$ N-bit extension length;

Step 1105: the receiver determines the virtual identification signalling according to the virtual identification index signalling obtained through blind detection, generates a scrambling code sequence of a demodulation pilot according to the virtual identification signalling, generates a pilot symbol sequence according to the generated scrambling code sequence, and performs channel estimation according to the pilot symbol sequence;

Specifically, when the receiver detects that the length of the DCI after blind detection is a normal length, the receiver generates the scrambling code sequence of the demodulation pilot according to a serving cell identification, wherein an initial factor of the generated scrambling code sequence of the demodulation pilot is: $c_{init}=(n_s/2+1)\cdot(2N_{ID}^{cell}+1)\cdot2^{16}+n_{SCID}$, where $n_s$ is a time slot index in a wireless frame and a range of values is: $n_s=\{0, 1, 2, 3 \ldots, 19\}$, $N_{ID}^{cell}$ is a notified serving cell identification, and $n_{SCID}$ is a receiver identification-related parameter; the pilot symbol sequence is generated according to a scrambling code sequence generating method, and a pilot sequence generating method in the 3GPP RAN1 36.211 protocol; a received signal is demodulated, i.e. the channel estimation is performed by using the generated pilot symbol sequence and the received signal. The received signal is a demodulation reference signal;

or when the receiver detects that the length of the DCI after blind detection is an extension length, the receiver generates the scrambling code sequence of the demodulation pilot according to the virtual identification signalling, wherein an initial factor of the generated scrambling code sequence of the demodulation pilot is: $c_{init}=(n_s/2+1)\cdot(2N_{ID}^{virtual}+1)\cdot2^{16}+n_{SCID}$, where $n_s$ is a time slot index in a wireless frame and a range of values is $n_s=\{0, 1, 2, 3 \ldots, 19\}$, $N_{ID}^{virtual}$ is the virtual identification signalling stored by the receiver, and $n_{SCID}$ is a receiver identification-related parameter; the pilot symbol sequence is generated according to a scrambling code sequence generating method, and a pilot sequence generating method in the 3GPP RAN1 36.211 protocol; a received signal is demodulated, i.e. the channel estimation is performed by using the generated pilot symbol sequence and the received signal. The received signal is a demodulation reference signal.

In the above embodiments, the virtual identification signalling may be also calculated directly or indirectly through other obtained parameters; the other obtained parameters include a $n_{SCID}$ parameter in DCI Format 2B, a $n_{SCID}$ parameter in DCI Format 2C or a $n_{SCID}$ parameter in new DCI in a further edition. At the moment, the length of the DCI is unchanged. The $n_{SCID}$ is not completely equal to the $n_{SCID}$ parameters in DCI Format 2B and DCI Format 2C, but a function of DCI Format 2B and DCI Format 2C, and a function value or a functional relation of the $n_{SCID}$ may be also notified through a virtual identification group, wherein when performing calculation by using $n_{SCID}$, the value of N is 1. In addition, the cells in the disclosure are a plurality of sets of CSI-RS resources configured to the receiver, and each set of CSI-RS resources corresponds to a cell.

Figure 12:
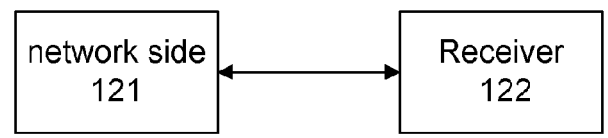
FIG. 12 is a structural diagram for implementing a system for notification of scrambling code identification signalling group according to the present disclosure.

To implement the methods above, the disclosure further provides a system for notification of scrambling code identification signalling group. FIG. 12 is a structural diagram for implementing a system for notification of scrambling code identification signalling group according to the present disclosure. As shown in FIG. 12, the system includes: a network side 121 and a receiver 122, wherein the network side 121 is configured to transmit a scrambling code identification signalling group to the receiver 122;

the receiver 122 is configured to generate a corresponding scrambling code sequence of a demodulation pilot according to the scrambling code identification signalling group, generate a pilot symbol sequence according to the scrambling code sequence of the demodulation pilot, and perform channel estimation according to the pilot symbol sequence.

The scrambling code identification signalling group includes a virtual identification signalling, and/or a virtual identification enabling signalling and/or a virtual identification index signalling.

When the scrambling code identification signalling group includes the virtual identification signalling, the virtual identification enabling signalling and the virtual identification index signalling, the step that the network side transmits the scrambling code identification signalling group to the receiver, and the receiver generates the corresponding scrambling code sequence of the demodulation pilot according to the scrambling code identification signalling group includes: the network side transmits the virtual identification signalling to the receiver via an SIB or an RRC signalling, and the receiver stores the virtual identification signalling in the received SIB or RRC signalling; the network side indicates whether the receiver is a potential virtual identification signalling user through the RRC signalling, performs blind detection for Del by 1 bit when the receiver is a potential virtual identification signalling user: and performs blind detection for the DCI by 0 bit when the receiver is not a potential virtual identification user; the receiver determines the virtual identification signalling according to the virtual identification index signalling obtained through the blind detection, and generates the scrambling code sequence of the DMRS according to the virtual identification signalling.

When the scrambling code identification signalling group includes the virtual identification signalling, the virtual identification enabling signalling and the virtual identification index signalling; the step that the network side transmits the scrambling code identification signalling group to the receiver, and the receiver generates the corresponding scrambling code sequence of the demodulation pilot according to the scrambling code identification signalling group includes: the network sale transmits the virtual identification signalling to the receiver through an SIB or RRC, and the receiver stores the virtual identification signalling in the received SIB or RRC; the network side indicates whether the receiver is a potential virtual identification signalling user through the RRC signalling, performs blind detection for received DCI by $\log_2 N$ bits when the receiver is a potential virtual identification user, and performs blind detection for the DCI by 0 bit when the receiver is not a potential virtual identification user; the receiver determines the virtual identification signalling according to the virtual identification index signalling obtained through the blind detection, and generates. The scrambling code sequence of the DMRS according to the virtual identification signalling, wherein N is the number of virtual cell identifications in the virtual identification signalling.

When the scrambling code identification signalling group includes the virtual identification signalling and the virtual identification index signalling. The step that the network side transmits the scrambling code identification signalling group to the receiver, and the receiver generates the corresponding scrambling code sequence of the demodulation pilot according to the scrambling code identification signalling group includes: the network side transmits the virtual identification signalling to the receiver via an SIB or an RRC signalling, and the receiver stores the virtual identification signalling in the received SIB or RRC signalling the receiver performs blind detection for DCI by 1 bit or $\log_2 N$ bits, determines the virtual identification signalling according to the virtual identification index signalling obtained through the blind detection, and generates, the scrambling code sequence of the demodulation pilot according to the virtual identification signalling.

In the method above, the SIB is SIB2, SIB3, SIB4, SIB5, SIB13 or SIB14.

When the scrambling code identification signalling group includes the virtual identification index signalling, the step that the terminal side generates the corresponding scrambling code sequence of the demodulation pilot according to the scrambling code identification signalling group includes: the receiver obtains the virtual identification signalling, performs blind detection for DCI by $\log_2 N$ bits or 1 bit, determines the virtual identification signalling according to the virtual identification index signalling obtained through the blind detection, and generates the scrambling code sequence of the demodulation pilot according to the virtual identification signalling.

When the scrambling code identification signalling group includes the virtual identification enabling signalling and the virtual identification index signalling, the step that the network side transmits the scrambling code identification signalling group to the receiver, and the receiver generates the corresponding scrambling code sequence of the demodulation pilot according to the scrambling code identification signalling group, includes: the receiver obtains, the virtual identification signalling and stores the obtained virtual identification signalling: the network side indicates whether the receiver is a potential virtual identification signalling user through an RRC signalling, performs blind detection for DCI by 1 bit when the receiver is a potential virtual identification user, and performs blind detection for the DCI by 0 bit when the receiver is not a potential virtual identification user; the receiver determines the virtual identification signalling according to the virtual identification index signalling obtained through the blind detection, and generates the scrambling code sequence of the DMRS according to the virtual identification signalling.

When the scrambling code identification signalling group includes the virtual identification enabling signalling and the virtual identification index signalling, the step that the network side transmits the scrambling code identification signalling group to the receiver, and the receiver generates the corresponding scrambling code sequence of the demodulation pilot according to the scrambling code identification signalling group, includes the receiver obtains the virtual identification signalling and stores the obtained virtual identification signalling; the network side indicates whether the receiver is a potential virtual identification signalling user through an RRC signalling, performs blind detection for DCI by $\log_2 N$ bits when the receiver is a potential virtual identification user; and performs blind detection for the DCI by 0 bit when the receiver is not a potential virtual identification user; the receiver determines the virtual identification signalling according to the virtual identification index signalling obtained through the blind detection, and generates the scrambling code sequence of the demodulation pilot according to the virtual identification signalling.

The step that the receiver obtains the virtual identification signal includes:
the receiver calculates the virtual identification signalling directly or indirectly through other obtained parameters; the other obtained parameters include a $n_{SCID}$ parameter in DCI Format 2B, a $n_{SCID}$ parameter in DCI Format 2C or a $n_{SCID}$ parameter in new DCI, wherein when calculating by using $n_{sID}$, the value of N is 1. The addition of 0 bit in the disclosure is the normal length.

The above are only preferred embodiments of the disclosure and should not be used for limiting the protection scope of the disclosure. Any modifications, equivalent replacements, improvements or the like shall fall within the scope of protection of the disclosure.

The invention claimed is:

1. A method for notification of scrambling code identification signalling group, wherein the method comprises:
   receiving, by a receiver, a scrambling code identification signalling group;
   wherein the scrambling code identification signalling group comprises at least one of the following: a virtual identification signalling, a virtual identification enabling signalling of one bit, and a virtual identification index signalling of one or more bits, where the virtual identification signalling includes one or more virtual cell identifications; and
   the method further comprises: receiving, by the receiver, the virtual identification signalling via a System Information Block (SIB) or a Radio Resource Control (RRC) signalling, and storing, by the receiver, the virtual identification signalling in the received SIB or RRC signalling;
   performing blind detection for Downlink Control Information (DCI);
   wherein the virtual identification index signalling is carried in DCI Format 2B or DCI Format 2C or a future format of the DCI;
   obtaining the virtual identification index signalling according to the blind detection, and determining the virtual identification signalling according to the corresponding virtual identification index signalling;
   generating, by the receiver, a corresponding scrambling code sequence of a demodulation pilot according to the determined virtual identification signalling;
   generating a pilot symbol sequence according to the scrambling code sequence of the demodulation pilot; and
   performing channel estimation according to the pilot symbol sequence.

2. The method according to claim 1, wherein when the scrambling code identification signalling group comprises the virtual identification signalling, the virtual identification enabling signalling and the virtual identification index signalling, the step of receiving, by a receiver, a scrambling code identification signalling group and the step of generating, by the receiver, a corresponding scrambling code sequence of a demodulation pilot according to the scrambling code identification signalling group comprise:
   receiving, by the receiver, the RRC signalling including the virtual identification enabling signalling to indicate whether the receiver is a potential virtual identification signalling user, performing blind detection for the DCI by 1 bit when the receiver is a potential virtual identification signalling user, and performing detection for the DCI by 0 bit when the receiver is not a potential virtual identification user;
   obtaining, by the receiver, the virtual identification index signalling corresponding to the receiver according to the detection, and determining the virtual identification signalling for generating the scrambling code sequence of the demodulation pilot according to the corresponding virtual identification index signalling;
   or wherein when the scrambling code identification signalling group comprises the virtual identification signalling, the virtual identification enabling signalling and the virtual identification index signalling, the step of receiving, by a receiver, a scrambling code identification signalling group and the step of generating, by the receiver, a corresponding scrambling code sequence of a demodulation pilot according to the scrambling code identification signalling group comprise:
   receiving, by the receiver, an RRC signalling including the virtual identification enabling signalling to indicate whether the receiver is a potential virtual identification signalling user, performing blind detection for received DCI by $\log_2 N$ bits when the receiver is a potential virtual identification user, and performing blind detection for the DCI by 0 bit when the receiver is not a potential virtual identification user;

obtaining, by the receiver, the virtual identification index signalling corresponding to the receiver according to the blind detection, and determining the virtual identification signalling for generating the scrambling code sequence of the demodulation pilot according to the corresponding virtual identification index signalling, wherein N is the number of virtual cell identifications in the virtual identification signalling;

or wherein when the scrambling code identification signalling group comprises the virtual identification signalling and the virtual identification index signalling, the step of receiving, by a receiver, a scrambling code identification signalling group and the step of generating, by the receiver, a corresponding scrambling code sequence of a demodulation pilot according to the scrambling code identification signalling group comprise:

performing, by the receiver, blind detection for DCI by 1 bit or $\log_2 N$ bits, obtaining the virtual identification index signalling corresponding to the receiver according to the blind detection, and determining the virtual identification signalling for generating the scrambling code sequence of the demodulation pilot according to the corresponding virtual identification index signalling.

3. The method according to claim 2, wherein the step of obtaining, by the receiver, the virtual identification signalling comprises:

calculating, by the receiver, the virtual identification signalling directly or indirectly through other obtained 1 bit parameters, the other obtained parameters include a $n_{SCID}$ parameter in DCI Format 2B, a $n_{SCID}$ parameter in DCI Format 2C or a $n_{SCID}$ parameter in new DCI.

4. The method according to claim 1, wherein when the scrambling code identification signalling group comprises the virtual identification index signalling, the step of generating, by the receiver, a corresponding scrambling code sequence of a demodulation pilot according to the scrambling code identification signalling group comprises:

obtaining, by the receiver, the virtual identification signalling, performing blind detection for DCI by $\log_2 N$ bits or 1 bit, obtaining the virtual identification index signalling corresponding to the receiver according to the blind detection, and determining the virtual identification signalling for generating the scrambling code sequence of the demodulation pilot according to the corresponding virtual identification index signalling;

or wherein when the scrambling code identification signalling group comprises the virtual identification enabling signalling and the virtual identification index signalling, the step of generating, by the receiver, a corresponding scrambling code sequence of a demodulation pilot according to the scrambling code identification signalling group comprises:

obtaining, by the receiver, the virtual identification signalling and receiving the obtained virtual identification signalling;

receiving, by the receiver, an RRC signalling including the virtual identification enabling signalling to indicate whether the receiver is a potential virtual identification signalling user, performing blind detection for DCI by 1 bit when the receiver is a potential virtual identification user, and performing blind detection for the DCI by 0 bit when the receiver is not a potential virtual identification user;

obtaining, by the receiver, the virtual identification index signalling corresponding to the receiver according to the blind detection, and determining the virtual identification signalling for generating the scrambling code sequence of the demodulation pilot according to the corresponding virtual identification index signalling;

or wherein when the scrambling code identification signalling group comprises the virtual identification enabling signalling and the virtual identification index signalling, the step of generating, by the receiver, a corresponding scrambling code sequence of a demodulation pilot according to the scrambling code identification signalling group comprises:

obtaining, by the receiver, the virtual identification signalling and storing the obtained virtual identification signalling;

receiving, by the receiver, an RRC signalling including the virtual identification enabling signalling to indicate whether the receiver is a potential virtual identification signalling user, performing blind detection for DCI by $\log_2 N$ bits when the receiver is a potential virtual identification user, and performing blind detection for the DCI by 0 bit when the receiver is not a potential virtual identification user;

obtaining, by the receiver, the virtual identification index signalling corresponding to the receiver according to the blind detection, and determining the virtual identification signalling for generating the scrambling code sequence of the demodulation pilot according to the corresponding virtual identification index signalling.

5. The method according to claim 4, wherein the step of obtaining, by the receiver, the virtual identification signalling comprises:

calculating, by the receiver, the virtual identification signalling directly or indirectly through other obtained parameters, the other obtained parameters include a $n_{SCID}$ parameter in DCI Format 2B, a $n_{SCID}$ parameter in DCI Format 2C or a $n_{SCID}$ parameter in new DCI, wherein when calculating by using $n_{SCID}$, the value of N is 1.

6. A method for notification of scrambling code identification signalling group, wherein the method comprises:

transmitting, by a network side, a scrambling code identification signalling group to a receiver;

wherein the scrambling code identification signalling group comprises at least one of the following: a virtual identification signalling, a virtual identification enabling signalling of one bit, and a virtual identification index signalling of one or more bits, where the virtual identification signalling includes one or more virtual cell identifications; and the method further comprises: transmitting, by the network side, the virtual identification signalling to the receiver via a System Information Block (SIB) or a Radio Resource Control (RRC) signalling;

performing blind detection for Downlink Control Information (DCI);

wherein the virtual identification index signalling is carried in DCI Format 2B or DCI Format 2C or a future format of the DCI;

obtaining the virtual identification index signalling according to the blind detection, and determining the virtual identification signalling according to the corresponding virtual identification index signalling;

generating, by the receiver, a corresponding scrambling code sequence of a demodulation pilot according to the determined virtual identification signalling;

generating a pilot symbol sequence according to the scrambling code sequence of the demodulation pilot; and performing channel estimation according to the pilot symbol sequence.

7. The method according to claim 6, wherein when the scrambling code identification signalling group comprises the virtual identification signalling, the virtual identification enabling signalling and the virtual identification index signalling, the step of transmitting, by a network side, a scrambling code identification signalling group to a receiver for enabling the receiver to generate a corresponding scrambling code sequence of a demodulation pilot according to the scrambling code identification signalling group comprise:

indicating, by the network side, whether the receiver is a potential virtual identification signalling user through the virtual identification enabling signalling included in the RRC signalling, wherein when the receiver is a potential virtual identification signalling user, a blind detection for Downlink Control Information (DCI) by 1 bit is performed, and when the receiver is not a potential virtual identification user, a blind detection for the DCI by 0 bit is performed;

wherein the blind detection is for enabling the receiver to obtain the virtual identification index signalling corresponding to the receiver and determine the virtual identification signalling for generating the scrambling code sequence of the demodulation pilot according to the corresponding virtual identification index signalling;

or wherein when the scrambling code identification signalling group comprises the virtual identification signalling, the virtual identification enabling signalling and the virtual identification index signalling, the step of transmitting, by a network side, a scrambling code identification signalling group to a receiver for enabling the receiver to generate a corresponding scrambling code sequence of a demodulation pilot according to the scrambling code identification signalling group comprise:

indicating, by the network side, whether the receiver is a potential virtual identification signalling user through the virtual identification enabling signalling included in an RRC signalling, wherein when the receiver is a potential virtual identification user, a blind detection for received DCI by $\log_2 N$ bits is performed, and when the receiver is not a potential virtual identification user, a blind detection for the DCI by 0 bit is performed;

wherein the blind detection is for enabling the receiver to obtain the virtual identification index signalling corresponding to the receiver and determine the virtual identification signalling for generating the scrambling code sequence of the demodulation pilot according to the corresponding virtual identification index signalling, wherein N is the number of virtual cell identifications in the virtual identification signalling;

or wherein when the scrambling code identification signalling group comprises the virtual identification signalling and the virtual identification index signalling, the step of transmitting, by a network side, a scrambling code identification signalling group to a receiver for enabling the receiver to generate a corresponding scrambling code sequence of a demodulation pilot according to the scrambling code identification signalling group comprise:

enabling the receiver to perform blind detection for DCI by 1 bit or $\log_2 N$ bits, wherein the blind detection is for enabling the receiver to obtain the virtual identification index signalling corresponding to the receiver, and determine the virtual identification signalling for generating the scrambling code sequence of the demodulation pilot according to the corresponding virtual identification index signalling.

8. The method according to claim 7, wherein the step of transmitting, by the network side, the virtual identification signalling comprises:

transmitting other 1 bit parameters including a $n_{SCID}$ parameter in DCI Format 2B, a $n_{SCID}$ parameter in DCI Format 2C or a $n_{SCID}$ parameter in new DCI to directly or indirectly indicate the virtual identification signalling to receiver.

9. The method according to claim 6, wherein when the scrambling code identification signalling group comprises the virtual identification index signalling, the step of enabling the receiver to generate a corresponding scrambling code sequence of a demodulation pilot according to the scrambling code identification signalling group comprises:

transmitting, by the network side, the virtual identification signalling, enabling the receiver to perform blind detection for DCI by $\log_2 N$ bits or 1 bit, wherein the blind detection is for enabling the receiver to obtain the virtual identification index signalling corresponding to the receiver, and determine the virtual identification signalling for generating the scrambling code sequence of the demodulation pilot according to the corresponding virtual identification index signalling or wherein when the scrambling code identification signalling group comprises the virtual identification enabling signalling and the virtual identification index signalling, the step of enabling the receiver to generate a corresponding scrambling code sequence of a demodulation pilot according to the scrambling code identification signalling group comprises:

transmitting, by the network side, the virtual identification signalling for storing in the receiver;

indicating, by the network side, whether the receiver is a potential virtual identification signalling user through the virtual identification enabling signalling included in an RRC signalling, wherein when the receiver is a potential virtual identification user, a blind detection for DCI by 1 bit is performed, and when the receiver is not a potential virtual identification user, a blind detection for the DCI by 0 bit is performed;

wherein the blind detection is for enabling the receiver to obtain the virtual identification index signalling corresponding to the receiver and determine the virtual identification signalling for generating the scrambling code sequence of the demodulation pilot according to the corresponding virtual identification index signalling;

or wherein when the scrambling code identification signalling group comprises the virtual identification enabling signalling and the virtual identification index signalling, the step of generating, by the receiver, a corresponding scrambling code sequence of a demodulation pilot according to the scrambling code identification signalling group comprises:

obtaining, by the receiver, the virtual identification signalling and storing the obtained virtual identification signalling;

indicating, by the network side, whether the receiver is a potential virtual identification signalling user through the virtual identification enabling signalling included in an RRC signalling, wherein when the receiver is a potential virtual identification user, a blind detection for DCI by $\log_2 N$ bits is performed, and when the receiver is not a potential virtual identification user, a blind detection for the DCI by 0 bit is performed;

wherein the blind detection is for enabling the receiver to obtain the virtual identification index signalling corresponding to the receiver, and determine the virtual identification signalling for generating the scrambling code sequence of the demodulation pilot according to the corresponding virtual identification index signalling.

10. The method according to claim 9, wherein the step of enabling the receiver to obtain the virtual identification signalling comprises:
enabling the receiver to calculate the virtual identification signalling directly or indirectly through other obtained parameters, the other obtained parameters include a $n_{SCID}$ parameter in DCI Format 2B, a $n_{SCID}$ parameter in DCI Format 2C or a $n_{SCID}$ parameter in new DCI, wherein when calculating by using $n_{SCID}$, the value of N is 1.

11. A receiver for notification of scrambling code identification signaling group, configured to:
receive a scrambling code identification signaling group;
wherein the scrambling code identification signaling group comprises at least one of the following: a virtual identification signaling, a virtual identification enabling signaling of one bit, and a virtual identification index signaling of one or more bits, where the virtual identification signaling includes one or more virtual cell identifications; and
the receiver is configured to receive the virtual identification signaling via a System Information Block (SIB) or a Radio Resource Control (RRC) signaling, store the virtual identification signaling in the received SIB or RRC signaling; to perform blind detection for Downlink Control Information (DCI);
wherein the virtual identification index signaling is carried in DCI Format 2B or DCI Format 2C or a future format of the DCI;
to obtain the virtual identification index signaling according to the blind detection, and determine the virtual identification signaling according to the corresponding virtual identification index signaling;
generate, by the receiver, a corresponding scrambling code sequence of a demodulation pilot according to the determined virtual identification signaling;
generate a pilot symbol sequence according to the scrambling code sequence of the demodulation pilot; and
perform channel estimation according to the pilot symbol sequence.

12. The receiver according to claim 11, wherein the receiver comprises a mobile terminal, a handset, a relay station or a HeNodeB.

13. A base station for notification of scrambling code identification signaling group, configured to:
transmit a scrambling code identification signaling group to a receiver;
wherein the scrambling code identification signaling group comprises at least one of the following: a virtual identification signaling, a virtual identification enabling signaling of one bit, and a virtual identification index signaling of one or more bits, where the virtual identification signaling includes one or more virtual cell identifications; and
the base station is configured to transmit the virtual identification signaling to the receiver via a System Information Block (SIB) or a Radio Resource Control (RRC) signaling;
to perform blind detection for Downlink Control Information (DCI);
wherein the virtual identification index signaling is carried in Downlink Control Information (DCI) Format 2B or DCI Format 2C or a future format of the DCI;
to obtain the virtual identification index signaling according to the blind detection, and determining the virtual identification signaling according to the corresponding virtual identification index signaling;
generate, by the receiver, a corresponding scrambling code sequence of a demodulation pilot according to the determined virtual identification signaling;
generate a pilot symbol sequence according to the scrambling code sequence of the demodulation pilot; and
perform channel estimation according to the pilot symbol sequence.

* * * * *